United States Patent
Mooney et al.

(10) Patent No.: US 8,542,300 B2
(45) Date of Patent: Sep. 24, 2013

(54) METHOD FOR REAL-TIME REMOVAL OF VERTICAL SCAN STREAKS IN A CCD

(75) Inventors: Paul Mooney, Pleasanton, CA (US); Chengye Mao, Fremont, CA (US)

(73) Assignee: Gatan, Inc., Warrendale, PA (US)

( * ) Notice: Subject to any disclaimer, the term of this patent is extended or adjusted under 35 U.S.C. 154(b) by 408 days.

(21) Appl. No.: 12/533,288

(22) Filed: Jul. 31, 2009

(65) Prior Publication Data
US 2010/0033605 A1   Feb. 11, 2010

Related U.S. Application Data

(60) Provisional application No. 61/085,810, filed on Aug. 1, 2008.

(51) Int. Cl.
*H04N 9/64*   (2006.01)
(52) U.S. Cl.
USPC .......................................... 348/248; 348/249
(58) Field of Classification Search
USPC ................... 348/248–250, 317, 320
See application file for complete search history.

(56) References Cited

U.S. PATENT DOCUMENTS

| 7,791,654 B2 * | 9/2010 | Kera .............................. 348/241 |
| 2006/0092283 A1 * | 5/2006 | Tanizoe et al. ........... 348/207.99 |
| 2007/0165120 A1 * | 7/2007 | Takane ......................... 348/248 |
| 2007/0242145 A1 * | 10/2007 | Hazelwood et al. .......... 348/249 |
| 2008/0165262 A1 * | 7/2008 | Kannermark et al. ........ 348/249 |
| 2009/0147108 A1 * | 6/2009 | Okura et al. .................. 348/249 |

OTHER PUBLICATIONS

Howell, Steven B., Overscan and Bias, in Handbook of CCD Astronomy, 2000, pp. 37-39, Cambridge University Press, Cambridge, UK.

* cited by examiner

*Primary Examiner* — Tuan Ho
*Assistant Examiner* — Shahbaz Nazrul
(74) *Attorney, Agent, or Firm* — Caesar, Rivise, Bernstein, Cohen & Pokotilow, Ltd.

(57) ABSTRACT

Methods are disclosed for correcting vertical line streaks in an interline or full-frame CCD. The method includes the step of subtracting an overscan row from each row of a previous image or from each row of a next image, such that each row of the final image contains the same readout smear effect and such that readout overscan rows contain the same smear information as each row of the final image. The method is also described for use with frame transfer CCDs.

10 Claims, 6 Drawing Sheets

_US 8,542,300 B2_

METHOD FOR REAL-TIME REMOVAL OF VERTICAL SCAN STREAKS IN A CCD

CROSS-REFERENCE TO RELATED APPLICATIONS

This utility application claims the benefit under 35 U.S.C. §119(e) of Provisional Application Ser. No. 61/085,810 filed on Aug. 1, 2008 and entitled Method for Real-Time Removal of Vertical Scan Streaks in a CCD, the entire disclosure of which is incorporated by reference herein.

FIELD OF THE INVENTION

This invention relates generally to charge coupled device imaging sensors and more particularly to methods for correcting imaging artifacts.

BACKGROUND OF THE INVENTION

Charge-coupled device (CCD) image sensors are divided into an array of pixels by vertical p-implant channel barriers and by horizontal polysilicon gates with voltage applied. Full-frame devices use the same area for accumulation of photo-electron charge and for readout and therefore require a shutter to operate without smear or streaking. Interline and frame-transfer devices, on the other hand, provide regions specialized for these two functions.

Interline devices split each pixel region into a photodiode charge accumulation region and a CCD charge transfer region with a gate separating the two. Exposure and readout can then occur simultaneously, with charge accumulation proceding in the photodiode while the CCD portion of the pixel is transferring charge from the previous exposure vertically towards the output structures. When both the exposure and the readout are complete, it is possible to transfer the charge from the photodiode to the CCD portion of the pixel, whereupon accumulation of the next pixel can begin in the photodiode and readout of the just-transferred charge can begin in the CCD portion. The CCD portion is masked so that newly incoming light will not contaminate the image of the previous frame while it is being read out.

Frame transfer devices are divided into two regions of pixels with one region masked. During an accumulation and readout phase, image charge accumulates in the unmasked region while the previous image, stored in the masked region is read out. During a rapid transfer phase, the next accumulated frame is moved into the just-cleared masked region. In both cases, because transfer from accumulation region to readout region is fast compared with the total exposure and readout time, no shutter is necessary, the illumination is left on continuously and close to 100% duty cycle is possible.

In interline CCDs, the masking of light is not perfect. As shown in FIG. 1, high-angle incoming light 40 entering the photodiode and/or light which scatters into a high angle 45 by the photodiode 20 can go under the mask 15 and be detected in the CCD portion 10 of the pixel. Charge transfer direction is shown in FIG. 1 as in and out of the page. Because the image in the CCD portion is being moved vertically towards the output structures during readout, illumination which leaks into the CCD during readout will create a streak in the readout image. FIG. 2 shows leakage 60 from a bright illumination source 50 into the masked charge-transfer structure 70, which can occur both during previous read or clear of the imaging area and after exposure during readout. The white cells 95 represent photodiodes. The charge-transfer cells in the top portion of the columns 70 have received leaked light during readout 60. The charge-transfer cells in the lower portion of the columns 90 have received leaked light during a clear or a previous read. Adjacent charge transfer cells shown in columns labeled 100 are depicted as not receiving any light from the depicted source 50.

In frame-transfer CCDs, the rapid transfer of the image from the unmasked, accumulation region to the masked readout region is not instantaneous but takes some time. When the illumination is on during the rapid scan a streak can again be generated since new light arriving during the rapid scan is added to different parts of the image as it is moved towards the readout structures. FIG. 3 shows an example of the effect 320 of charge leakage during readout scanning on an interline CCD-based electron microscope camera by leakage of light from the strong central spot 310 of the diffraction pattern.

As shown in FIG. 4, a frame transfer CCD, having an unmasked area 120 and a masked area 130 has a streak 111, 112, 113 and 114 due to the finite time taken to transfer the image under the storage-area mask. Analogous to the case of the interline CCD, there is a streak from scanning both before 114 and after exposure 112. The transferred charge from the image spot 110 is shown as 113. The streak from the current frame transfer is shown as 112 and the streak from the previous frame transfer is shown as 114.

Aside from interline and frame-transfer CCDs, there is sometimes a need to operate conventional full-frame CCDs without a shutter, as, for instance, when the frame rate is too high for the speed of a slow shutter. In this case, since the scan speed is normal slow readout and since the scanned image is not masked, a large component of smear can be added to the image as it is scanned and read.

It would be advantageous if there were a way to correct for streaking using digital post-processing. Imaging analysis alone is inadequate for this task, however, because while the streaking pattern is purely vertical in nature, the streak is underdetermined by the information in the streaked image alone because of the possibility of the existence of vertical or constant features in the image which could be incorrectly analyzed as streaking and removed from the image, creating artifacts. What is needed is a way to accurately measure the streaking independent of the exposed, accumulated image.

Thus there remains a need for a smear correction method which is accurate but which also causes only a modest reduction in frame rate and maintains fast response time to movements in the impinging image illumination.

SUMMARY OF THE INVENTION

A method is disclosed for scanning an interline or full-frame CCD. The method includes the step of subtracting an overscan row from each row of a previous image or from each row of a next image, such that each row of the final image contains the same readout smear effect and such that readout overscan rows contain the same smear information as each row of the final image.

In a further embodiment, a method is disclosed for scanning a frame-transfer CCD to produce a final image The method includes the step of subtracting an overscan row from each row of a previous image or from each row of a next image, such that each row of the final image contains the same readout smear effect and such that readout overscan rows contain the same smear information as each row of the final image.

In a further embodiment, a method is disclosed for correction of image artifacts produced during scanning and readout. The method includes scanning a first image to be corrected; performing a readout of a zero-second image with the same illumination conditions as used in the of the first image but with a zero-second exposure; and subtracting the zero-second image from the first image to be corrected.

DESCRIPTION OF THE PREFERRED EMBODIMENT OF THE INVENTION

Figure 1:
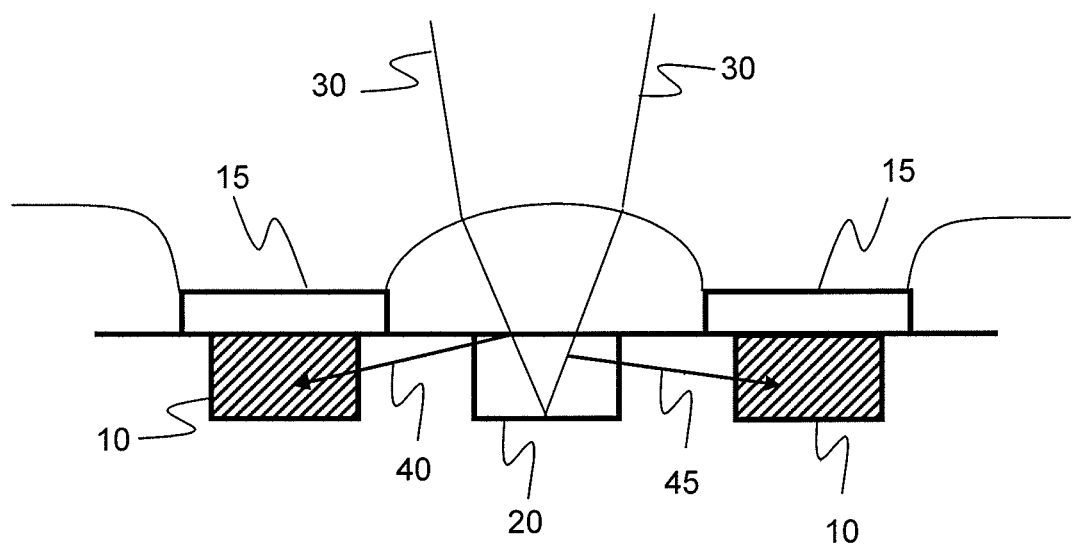
FIG. 1. is a vertical cross section of a prior art interline CCD pixel structure. Charge transfer direction is in and out of the page.
Figure 2:
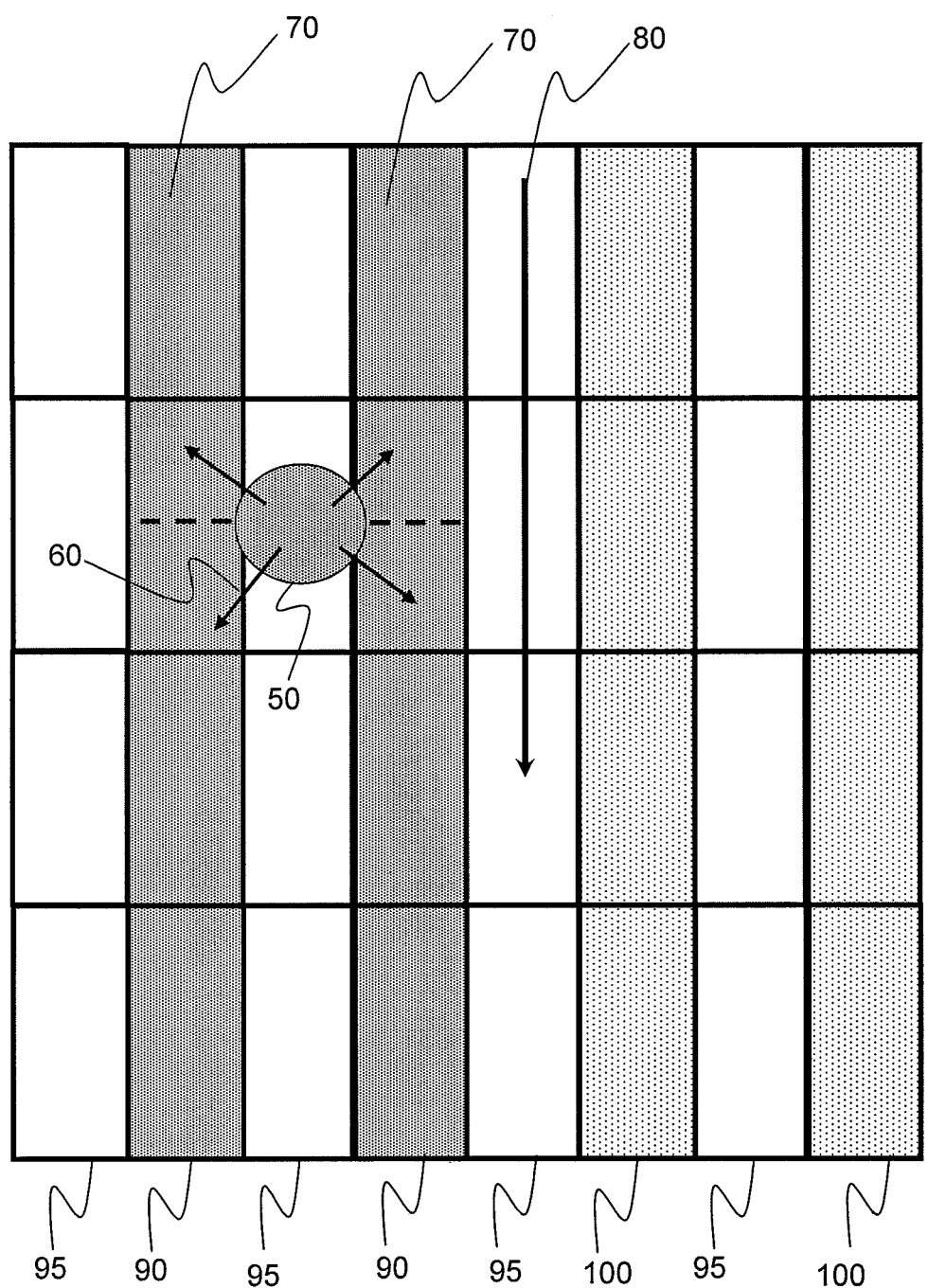
FIG. 2 is a diagram showing leakage into the masked charge-transfer structure occuring both during previous read or clear of the imaging area and after exposure during read-out.
Figure 3:
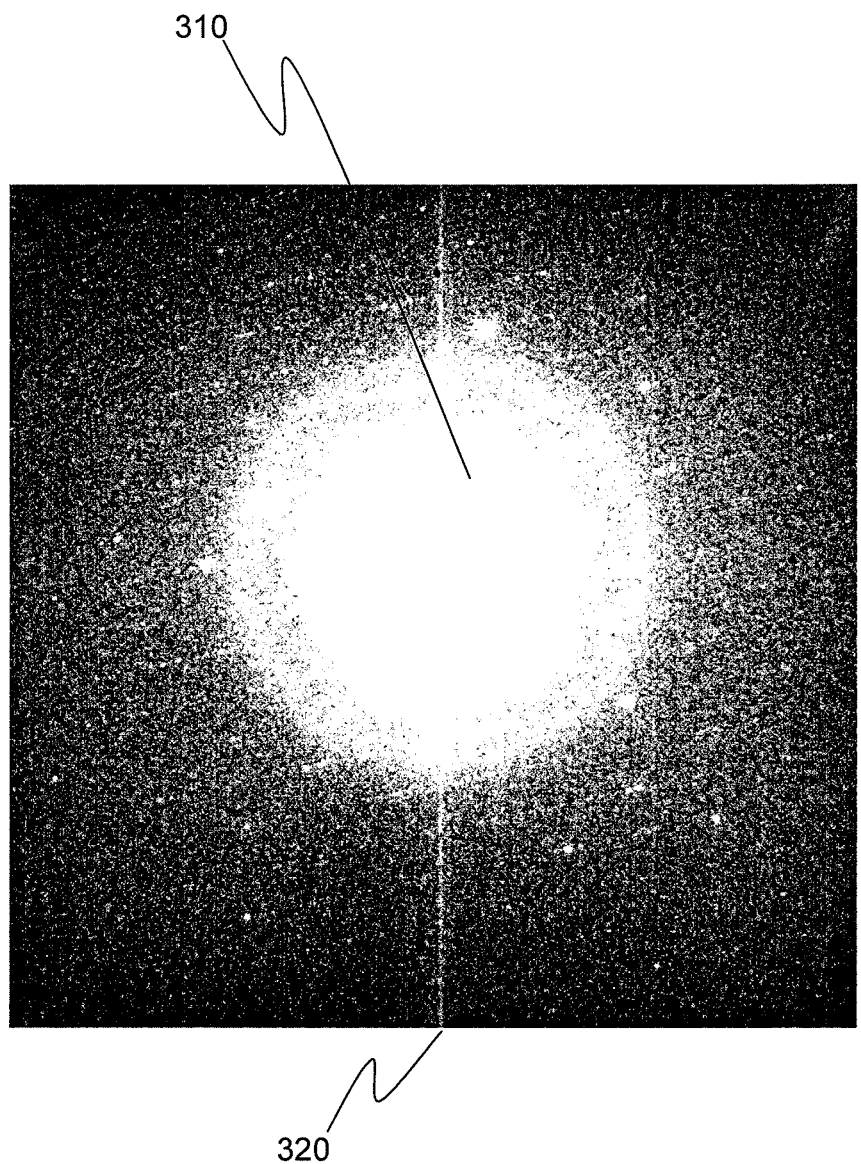
FIG. 3 is an image of an electron diffraction pattern showing a streak created on a prior art interline CCD by leakage of light from the strong central spot of the diffraction pattern.
Figure 4:
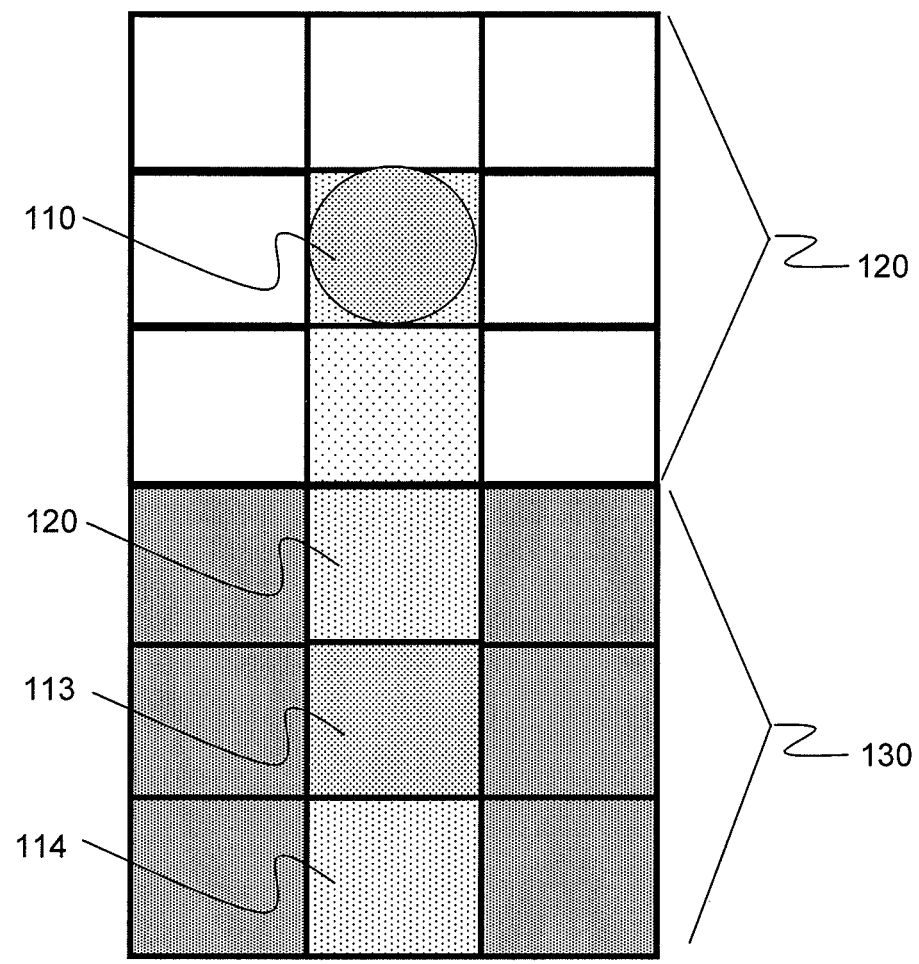
FIG. 4 is a diagram of a prior art frame transfer CCD showing a streak due to the finite time taken to transfer the image under the storage-area mask.

In an embodiment of the invention one would acquire a reference image paired with each acquired image which was identical in manner of readout to the acquired image but which had an exposure time of zero seconds. This method would be effective at removing scan smear but would double the acquisition time, and in so doing also slow the response time of the correction to changes in the fixed image (such as moving the beam spot or specimen) and slow the frame rate of fast continuous acquisition. Thus this method would only be of use when speed is unimportant, as for single-frame acquisition. It would also be useful incases when the method below is not possible, such as for the case of sub-area readout on an interline device.

When a CCD is scanned vertically by more rows than are in the stationary exposed, accumulated image, the extra rows beyond the accumulated image have been scanned across the CCD in a manner similar to the rows that contained the accumulated image but contain no accumulated charge from the constant image. These rows are commonly called "overscan" rows. In interline and full-frame CCDs, by controlling the scanning conditions of the accumulated image such that the scanning, which is done to clear the accumulation region prior-to exposure, and the scanning, which is done after the exposure to move the accumulated image towards the readout structure, is always done at the same speed and such that the overscan rows are also scanned at that speed, a single overscan row will have the same smear pattern as each row of the read-out image. It is then possible to correct the smear of the entire image by subtracting the same overscan row from each row of the full image.

Since there is noise in each pixel of an image, including the overscan row, and since the human eye will pick up repeated patterns very effectively, an image corrected in this manner will have apparent vertical streaks due to the consistent subtraction of the same noisy row from each row of the image. To reduce this affect, it is also desirable to acquire more than a single overscan row and to average a reference row from a multiplicity of rows. In this manner, random noise is reduced and the visibility of the correction eliminated. Due to the varying content of noise in different applications, the amount of averaging must be determined empirically. In principal, the number of rows averaged could be a user-specifiable parameter. Even a large multiplicity of rows included in the vertical overscan average, such as fifty, involves significantly less time than acquisition of an entire 0 second exposure reference frame as described in the previous section, so the method provides a significantly faster method for obtaining a valid smear reference. With current computers, the time needed for averaging the rows is insignificant compared with the acquisition time.

For a frame-transfer CCD, the smear is not produced during readout of the transferred frame as in the full-frame or interline CCD, but rather during the rapid transfer from the unmasked accumulation region to the masked storage/readout region. Since pixels in the accumulation region only experience two types of scan: (1) No scan during accumulation and (2). Rapid scan during image transfer, it is simple to guarantee accurate match of overscan smear measurement with smear in the transferred image. Overscan must occur during image transfer. Since the storage/readout region is full at the time that the image transfer is complete, it is necessary to sacrifice image area equal to the number of overscan rows desired or, subject to the limitations of the charge storage capacity of the array pixels, bin the overscan rows into a single row of the storage/readout region, allowing a sacrifice of only a single row of the transferred image. There are two ways to discard the rows needed for storage of the transferred overscan: (1) By dumping into the serial register and clearing the saturated charge, and (2) By masking the bottom of the accumulation region so that the active image area is effectively reduced by the number of overscan rows desired. In this manner the active image area is placed at the bottom of the storage/readout region by the combined action of the image transfer and the transfer overscan. The actual clocking of 1 and 2 are the same. The main difference is that in method 1 discarded image charge is dumped, with the possible risk of charge spill back into the image. The compromise with method 2 is that a means to mask the image is needed and that said means will need to be adjustable if the number of overscan rows is to be selectable.

In an embodiment, the correction is done using the overscan from the same image, in which case the image must be buffered and held for correction until the overscan has been acquired. This would be the default for single-frame acquisition. If the correction is done from the overscan of the previous image, it is possible to do the correction as the next image is being acquired, allowing faster readout. When the illuminating image is moving, it is possible for there to be a slight difference between the position of the streak accumulated in the image readout and the streak measured in the overscan of the previous or next frame. In this case, it is possible to reduce the magnitude of the error by averaging the overscan measurements immediately prior to and after the image to be corrected and using the average to correct the image.

It should be noted that overscan subtraction will only work when the read-out image of each row of the image has had the same scanning history in terms of time spent illuminated by the beam or by leakage at each spot on the illumination. This is not true in the case of sub-area readout on a full-frame or interline CCD since vertical shift rate changes depending on whether the image content of the row is being read or simply flushed. In the case of a frame-transfer CCD, sub-area read shift rate changes occur during read of the stored image and not during the rapid frame transfer, so vertical overscan subtraction will work for sub-area read on a frame-transfer device.

Figure 5:
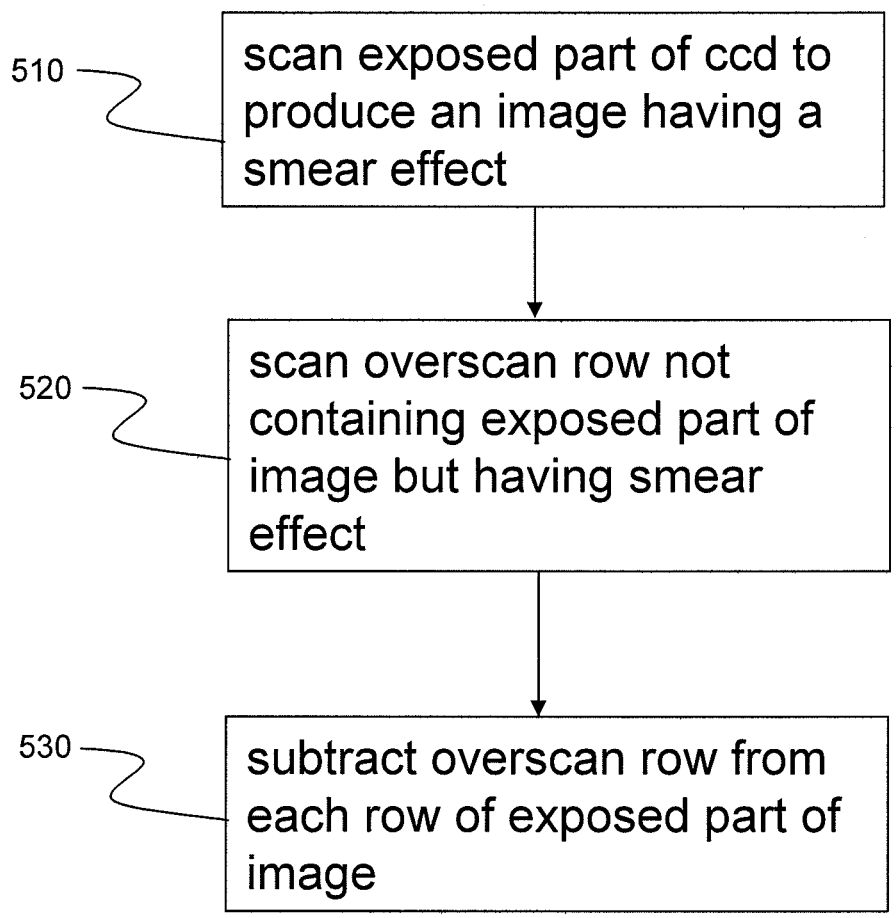
FIG. 5 is a flow diagram of an exemplary process for removing scan streaks in interline or full-frame CCD.

With reference to FIG. 5, an exemplary method is disclosed for scanning an interline or full-frame CCD to produce a corrected final image. The method includes the step scanning an exposed portion of a CCD to produce an image having a smear effect. 510 An overscan row not containing the exposed part of the image but having the same smear effect is scanned. 520. The overscan row is subtracted 530 from each row of the exposed part of the image to produce a corrected image.

Figure 6:
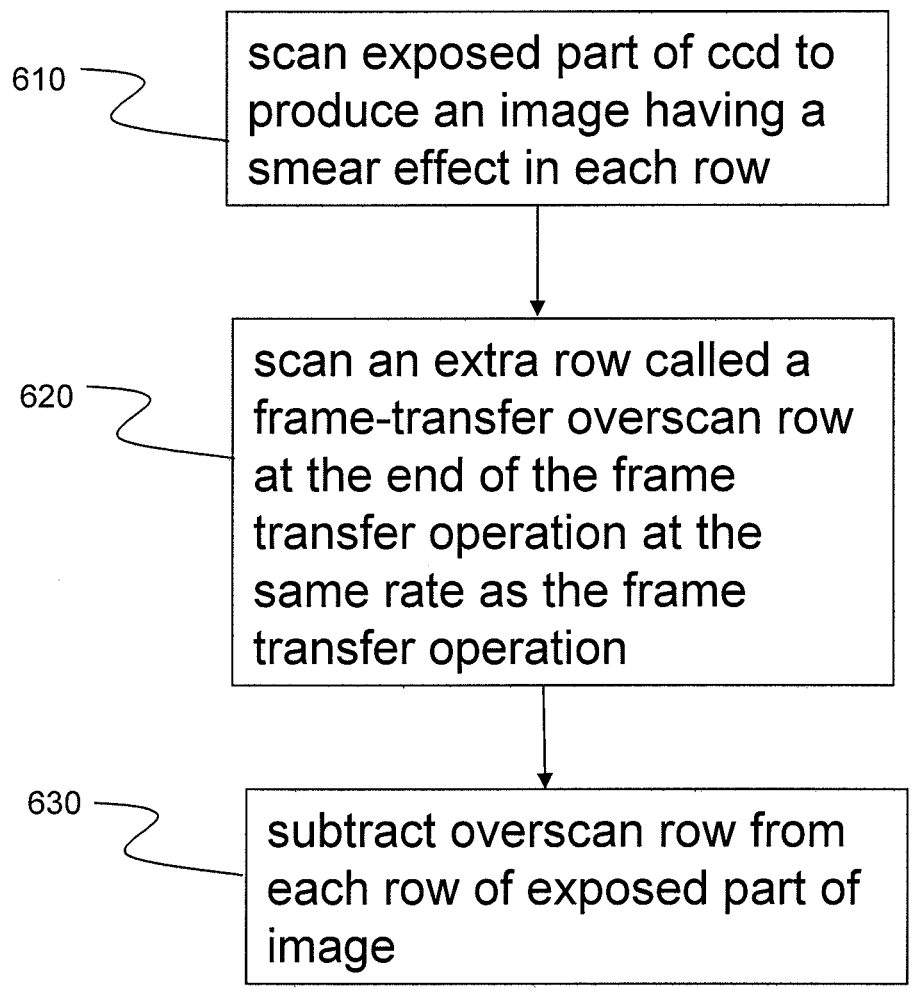
FIG. 6 is a flow diagram of an exemplary process for removing scan streaks in a frame transfer CCD.

With reference to FIG. 6, an exemplary method is disclosed for scanning a frame-transfer CCD to produce a corrected final image. The method includes the step scanning an exposed portion of a CCD to produce an image having a smear effect. 610 An extra row called a frame-transfer overscan row is scanned at the end of the frame transfer operation at the same rate as the frame transfer operation. 620. The overscan row is subtracted 630 from each row of the exposed part of the image to produce a corrected image.

While certain representative embodiments and details have been shown for purposes of illustrating the invention, it will be apparent to those skilled in the art that various changes in the methods and apparatus disclosed herein many be made without departing from the scope of the invention.

The invention claimed is:

1. A method of correcting scan-produced artifacts in an interline CCD having an array of pixel cells arranged into x columns and y rows, each pixel cell comprising a photodiode portion and a charge transfer portion covered by a mask, the method comprising the steps of:
   exposing the CCD to light to create an image; wherein a portion of the light leaks past the mask into the charge transfer portion of a first pixel cell having a first row and first column position;
   transferring y rows of x stored charges to an output structure of the CCD to read out said image, wherein during said transferring stored charges in said first column include charge resulting from said leaked light at said first pixel cell;
   transferring at least one additional row of said stored charges to said output structure;
   subtracting said additional row from each row of said image to produce a corrected image.

2. The method of claim 1 used in interline CCDs, having a row-scanning rate, in which the CCD is prepared for a next exposure by clearing action of a previous read such that row-scanning rate remains constant at all times.

3. The method of claim 1 in which multiple said additional rows are read out, followed by averaging of said rows and subtracting of said average from each row of the image.

4. A method of correcting scan-produced artifacts in a frame-transfer CCD comprising
   scanning the CCD in a frame-transfer operation at a scan rate to produce a read out of an exposed part of the image having rows which are read out containing the same frame-transfer smear effect;
   scanning an extra row called a frame-transfer overscan row at the end of said frame transfer operation at the same rate as the frame transfer operation to produce a readout of the overscan row; and
   subtracting the readout of the overscan row from each row of the readout of the exposed portion of the image;
   acquiring a series of images to produce an overscan row from each image in said series; averaging the overscan row taken from each image in the series and subtracting said average from each row of the next image in the series.

5. The method of claim 1 further comprising
   acquiring of a series of images producing an overscan row from each image in said series and subtracting said overscan row taken from each image in said series from each row of the image in said series from which it was taken.

6. The method of claim 1 further comprising
   acquiring of a series of images to produce an overscan row from each image in said series and subtracting said overscan row taken from each image in said series from each row of the image which follows said overscan row it in said series.

7. The method of claim 1 further comprising
   acquiring a series of images to produce an overscan row from each image in said series; averaging the overscan image taken from each image in the series and subtracting said average from each row of the next image in the series.

8. The method of claim 3 further comprising
   acquiring of a series of images producing an overscan row from each image in said series and subtracting said overscan row taken from each image in said series from each row of the image in said series from which it was taken.

9. The method of claim 3 further comprising
   acquiring of a series of images to produce an overscan row from each image in said series and subtracting said overscan row taken from each image in said series from each row of the image which follows said overscan row it in said series.

10. The method of claim 3 further comprising
    acquiring a series of images to produce an overscan row from each image in said series; averaging the overscan image taken from each image in the series and subtracting said average from each row of the next image in the series.

* * * * *